Dec. 25, 1934.  H. C. KRAPF ET AL  1,985,641
ALTERNATING CURRENT DIRECT CURRENT SUPPLY SYSTEM FOR AIR CONDITIONED CARS
Filed July 7, 1932
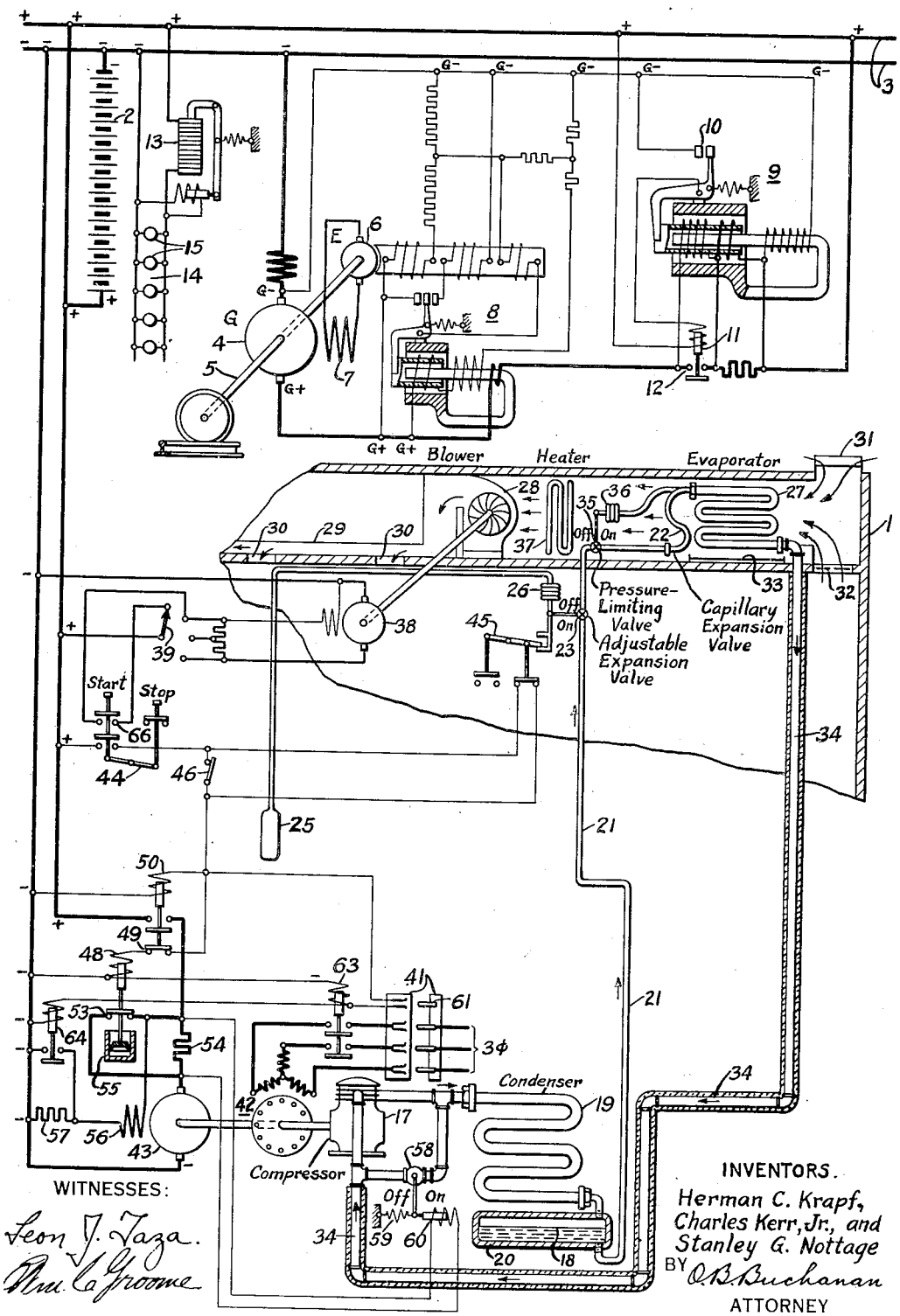
INVENTORS.
Herman C. Krapf,
Charles Kerr, Jr., and
Stanley G. Nottage
BY O.B. Buchanan
ATTORNEY
WITNESSES:
Leon J. Jaza.
Wm. C. Groome Patented Dec. 25, 1934

1,985,641

UNITED STATES PATENT OFFICE 1,985,641

ALTERNATING - CURRENT DIRECT - CURRENT SUPPLY SYSTEM FOR AIR-CONDITIONED CARS

Herman C. Krapf, Wilkinsburg, Charles Kerr, Jr., Edgewood, and Stanley G. Nottage, Murrysville, Pa., assignors to Westinghouse Electric & Manufacturing Company, East Pittsburgh, Pa., a corporation of Pennsylvania Application July 7, 1932, Serial No. 621,134

8 Claims. (Cl. 171—313)

Our invention relates to an electric power-supply system particularly adapted for railway cars, and it has particular reference to railway cars which are equipped with a storage battery and an axle generator for charging the storage battery, and direct-current motor means operable from the storage battery and axle generator for driving a relatively heavy mechanical load, the characteristic feature of our invention being that alternating-current motor means are also provided for this major-load device, and a detachable plug connection is provided on the side of the car whereby, when the car is standing in the station yard, the alternating-current motor means may be utilized to drive the major-load device, and not only save the drain on the storage battery (the axle generator being necessarily inoperative because the car is standing still), but charging the storage battery through the operation of the direct-current motor means as a direct-current generator driven by the alternating-current motor means.

Our invention is particularly adaptable, and is actually designed, for an air-conditioned railway car in which suitably cooled and dehumidified air is supplied to the interior of the car during the summer months. In such a car, we utilize a mechanical refrigerating system requiring a compressor motor which takes several times the amount of power usually consumed by the normal electric lighting and general utility load on a railway pullman observation or dining car, in addition to a smaller motor or motors for providing the air circulation. Consequently, it has been necessary to provide a larger axle generator, while the size of the storage battery may be left unchanged, unless the cycle of operations of the car is such that it is standing still, with the compressor motor running off of the battery, for an unusually long proportion of the total time. It will also be necessary to provide means for pre-cooling the car in the station yards, before it is put into service, or for maintaining the cooling in case of a long stand-over at a station which is equipped with plug outlets for supplying alternating-current power for driving the alternating-current compressor motor means.

For short stops, the refrigerating plant will operate on the storage battery alone, without any serious drain on the battery, and when the train is in motion, most or all of the power for the compressor motor will be supplied by the axle generator, which at full speeds, will also supply some additional power for charging the battery.

With the foregoing and other objects in view, our invention consists in the methods, apparatus and systems hereinafter described and claimed and illustrated in the accompanying drawing, the single figure of which is a diagrammatic view of circuits and apparatus embodying our invention in a preferred form.

As shown in the drawing, our invention relates to a railway car 1 which is equipped with a storage battery 2, the terminals of which are connected to a direct-current bus 3. In one installation embodying our invention, we provide a 15 kilowatt axle-driven direct-current generator 4 which is mechanically driven from an axle 5 of the railway car by any suitable drive-connection, which forms no part of our present invention, but which, as a matter of actual practice, involves a gear-unit drive means which constitutes the subject-matter of an application of W. A. Brecht, Serial No. 648,203, filed December 21, 1932, for Railway axle generators, assigned to the Westinghouse Electric & Manufacturing Company.

Mounted on the shaft of the direct-current generator 4 is an exciter 6 which supplies current to the main field-winding 7 of the axle-driven generator 4. On account of the unprecedentedly large size of the axle generator, it has been found inexpedient to utilize any of the polarity-changing switches which have heretofore been utilized on axle-generator car-lighting systems to reverse the polarity of the generator when the direction of movement of the car reverses.

Without entering into a discussion of the various reasons which made it necessary for us to dispense with these polarity-changing switches, it will suffice to say such switches have been dispensed with, and we utilize, instead, a special exciter construction whereby its residual magnetism is considerably higher than the residual magnetism of the axle generator, so that the generator will always build up in the proper direction, no matter which way it is rotated, as set forth in an application of C. F. Jenkins, Serial No. 621,161, filed July 7, 1932, for an Axle generator with exciter, assigned to the Westinghouse Electric & Manufacturing Company.

The voltage of the exciter is controlled by any suitable voltage regulator 8 which holds the voltage of the axle generator to a constant value after the railway car has reached a predetermined minimum speed. While the details of this voltage regulator do not constitute a part of our present invention, it may be noted that this mechanism, also, had to be especially designed, in view of the wide range of speeds involved, and in view of the high retentivity of the exciter field frame. The particular design shown in the drawing constitutes the subject-matter of an application of Herman C. Krapf and J. O. Sherrard, Serial No. 621,135. filed July 7, 1932, patented Aug. 21, 1934, No. 1,971,109, for Voltage regulators for axle generators, assigned to the Westinghouse Electric & Manufacturing Company.

The axle generator 4 is connected to, and disconnected from, the direct-current bus 3 by means of an electro-responsive reverse-current switch 9, which serves the purpose of connecting the generator to the direct-current bus when the generator has a voltage sufficient to supply current to the bus, and serving also to disconnect the generator in time to prevent a material reverse-current flow to the generator from the bus. As shown, the contacts 10 of the reverse-current switch are utilized to control a separate electro-magnetic contactor 11, the contacts 12 of which are connected in the generator circuit, thereby reducing the duty required of the reverse-current switch contacts 10. The particular reverse-current switch shown in the drawing constitutes the subject-matter of an application of Donald W. Exner, Serial No. 621,224, filed July 7, 1932, assigned to the Westinghouse Electric & Manufacturing Company.

In a typical installation embodying the equipment thus far described, a 16-cell 32-volt, 1000-ampere-hour battery 2 is utilized, which is charged by a 15-kilowatt axle-driven generator 4, which is so designed that it is capable of carrying the entire electrical load of the railway car at a car speed of between 35 and 40 miles per hour. At higher speeds, up to 100 miles per hour, the axle generator will also charge the battery, while the voltage regulator 8 limits the voltage to a maximum value of about 38 volts. The regulator begins to vibrate when the generator voltage reaches about 30, or slightly less than the battery voltage, and it ceases to vibrate, with its contacts sealed over to the minimum-excitation side, at a speed close to the maximum speed just indicated.

As is usual in car-lighting systems, there is a difference of about 6 or 8 volts between the battery-discharge voltage and the charging voltage of the battery. This condition is usually taken care of by a feeder regulator 13, usually of the carbon-pile type, for maintaining a substantially constant voltage on a lighting-circuit feeder 14 across which the car lights 15 are connected.

To the electrical equipment thus far described, is added, according to our invention, a mechanical refrigeration system of any preferred type, except that it involves a major-load device, which is driven by a special alternating-current direct-current dynamo-electric machine means, subsequently described. The particular refrigerating system shown in the drawing constitutes the subject-matter of an application of Frank Conrad, Serial No. 653,516, filed January 25, 1933, for an Air-conditioning system, assigned to the Westinghouse Electric & Manufacturing Company.

In its essential features, the refrigerating equipment includes a compressor 17 which is located underneath the car and which supplies a suitable vaporizable refrigerant 18 to a condenser 19, which is air-cooled so as to condense the refrigerant to a liquid form. The refrigerant then passes to a liquid storage-tank 20, from which it is conducted, by a suitable feed-pipe 21, to a so-called "expansion-valve", by which term we mean to include any pressure-reducing means for absorbing the pressure of the liquid in the storage-tank 20. It will be understood that this pressure-absorption in the expansion-valve represents but a small proportion of the mechanical work done by the compressor, the major portion of which results in the condensation of the refrigerant.

In the particular system shown on the drawing, the expansion-valve is in two parts, the principal portion of which is in the form of a capillary tube or tubes 22, which constitute a constant-opening expansion-valve. In addition to the capillary expansion-valve 22, we also supply an adjustable expansion-valve 23, which may be adjusted either by hand or by a thermostat comprising a bulb 25 filled with any suitable fluid having a high rate of thermal expansion, communicating with a sylphon bellows 26 located at the adjustable expansion-valve 23 for operating the same, the thermostatic bulb responding to the temperature of the interior of the railway car. This adjustable expansion-valve in most cases can be left on full all the time, without adjustment, there being a very considerable amount of self-regulating motion in the particular design of the capillary expansion-valve with reference to the rest of the refrigerating system.

The refrigerant which leaves the expansion-valves discharges into an evaporator 27 which is located under the roof of the car at one end, and which is heated by the conditioned air which is supplied to the car, said air being drawn over the evaporator coils by a blower 28 from which the air is discharged into the duct 29 running the length of the car, just under the side ceiling of the car on either side of the central portion of the top of the car, the air being discharged from this duct through a plurality of lateral openings 30. The air which passes over the evaporator is partly fresh air drawn in from the outside through an air-intake 31, and partly recirculated air which is drawn from the interior of the car through a register 32.

The evaporator 27 is designed to have a sufficient surface-area to evaporate or vaporize all of the refrigerant therein at the maximum rate of flow of the refrigerant, thereby absorbing the latent heat of this quantity of refrigerant from the air which is drawn over the evaporator by means of the blower 28, cooling this air to 60 degrees and condensing enough water out of the air to make it substantially saturated at 60 degrees, the condensed moisture being collected in a tray 33.

It will be understood that, in a railway car, on a hot day, the top and side walls, particularly the top, will be extremely hot, with the result that the conditioned air, which is substantially saturated at 60 degrees, will be heated, in passing down the side walls of the car, to a temperature of 75 degrees, before it reaches the level of the head of a passenger standing up in the car, at which temperature the air will have a humidity of only 50%, which is well within the so-called "comfort zone."

On cooler days, when the rate of flow of the refrigerant automatically adjusts itself to a lower rate, principally on account of the lower temperature, and hence the lower pressure, of the refrigerant within the condenser 19, the liquid refrigerant in the evaporator will all evaporate before it passes all the way through the evaporator coils, so that these coils will be cooled for only a part of their length, say the top half, so that only half of the air to be conditioned, in passing over the evaporator or cooler coils 27, will be reduced in temperature to about 60° F., the remaining air being only very slightly cooled so that the air which is supplied to the car by the blower 28 consists, under these circumstances, of a mixture of conditioned air and substantially unconditioned air, the mixture having a temperature somewhat higher than 60° F.

The vaporized refrigerant which leaves the evaporator 27 is returned to the compressor by means of a large, heat-insulated return-pipe 34, so that the above-described cycle is continuously repeated.

As a safety-measure to guard against faulty operating conditions in which excessive pressures build up in the evaporator 27, there is provided a pressure-limiting, cut-off valve 35 which is automatically cut off by a sylphon bellows 36 connected to the evaporator so as to be responsive to the pressure therein.

For use only in the winter time, a heater 37, which may consist of a steam radiator, is provided in the path of the conditioned air before it passes through the blower 28.

The blower 28 is driven by a direct-current motor 38 which is operated from the direct-current bus 3. In the particular arrangement shown, the blower motor 38 is provided with a starting switch 39 which gives three different operating speeds of the blower whereby the rate of flow of the conditioned air may be adjusted in a manner dictated by experience. In winter time, the amount of heat abstracted from the heater coils 37 will be increased by an increase in the speed of the blower. In summer time, the amount of heat absorbed by the evaporator coils 27 will not be materially affected by the speed of the circulated air, so long as the speed is sufficient to evaporate the liquid refrigerant as fast as it passes through the evaporator, because the amount of refrigeration is dependent almost entirely upon the number of pounds of refrigerant evaporated per hour, or upon the rate of flow of the refrigerant, which, as pointed out above, is mainly dependent upon the temperature of the condenser 19, and, of course, upon the adjustment of the adjustable expansion-valve 23, in case such adjustment is utilized.

The compressor 17 is driven by a dynamo-electric means having both direct-current and alternating-current terminals, said means being preferably of a type in which the direct-current voltage is independent of the alternating-current voltage, thereby making the battery-charging operation independent of the voltage on the alternating-current line to which the alternating-current terminals are connected when the car is standing in the station yard or elsewhere where there is a detachable plug connection for cooperating with one or more detachable plug connections 41 located at the side or sides of the car, whereby an external three-phase source may be connected to the car.

The particular dynamo-electric means for driving the compressor, as shown in the drawing, preferably comprises a three-phase induction motor 42 and a direct-current machine 43 which may operate either as a motor or as a generator.

Control means is provided for starting and stopping the compressor 17, said control means including a start-and-stop push-button 44 which may work in conjunction with an automatically-operated snap-switch 45 which is moved to its "on" position by means of the thermostatic bellows 26 when the room-temperature comes up to a predetermined value, and which is automatically turned off when the room-temperature falls to a predetermined value. The thermostatically-operated snap-switch may be cut out by means of a by-pass circuit including a knife switch or manually-operated snap-switch 46.

Considering first the operation of the compressor from the direct-current bus 3, it will be noted that power is supplied from the start-stop push-button 44 to the operating coil of an accelerating relay 48, through normally closed back-contacts 49 on the main direct-current contactor 50, which connects the direct-current compressor-motor 43 across the direct-current bus 3. The operating coil of the contactor 50 is energized at the same time as the operating coil of the accelerating relay 48, but the design of the relay is such that the accelerating relay picks up first, before the back-contacts 49 of the contactor 50 are opened by the operation of the contactor. When the accelerating relay 48 operates, it opens its normally closed contacts 53, thereby removing a short-circuit across a serially-connected resistor 54 in series with the motor armature. The accelerating relay is provided with a dash-pot 55 which is so arranged as to retard the closing of the relay contacts 53, without materially retarding the opening of the relay contacts. Thus the motor starts with the resistor 54 in series with it, and, after a time interval determined by the operation of the dash-pot 55, the resistor 54 is short-circuited, thus connecting the motor armature directly across the direct-current bus 3. The compressor motor 43 is provided with a shunt field winding 56, which is connected directly across the direct-current bus 3 through a field rheostat 57, as soon as the main direct-current contactor 50 picks up.

When the direct-current compressor motor 43 is started, the series resistor 54 will be connected in series with it, and at the same time means are provided for unloading the compressor, so as to relieve the duty on the motor during this starting period. This means comprises an unloader valve 58 which is diagrammatically illustrated on the drawing, the details of which are covered in an application of J. F. Koch, Serial No. 621,210, filed July 7, 1932, assigned to the Westinghouse Electric and Manufacturing Company.

The unloader valve 58 provides a by-pass circuit by-passing the refrigerant around the compressor, so that when the valve is opened, the duty on the compressor is very much reduced. The valve is normally closed by means of a spring 59 and is opened by means of a solenoid 60 which is connected across the series-resistor 54, so that when the direct-current compressor motor 43 is first energized, the compressor unloader valve 58 will be opened by the solenoid 60, said solenoid being deenergized as soon as the accelerating relay 48 returns to its normal deenergized position, short-circuiting the series resistor 54.

When the car is standing still and is connected, by means of the detachable plug connection 41, to an external source of three-phase power, an auxiliary control-circuit connection is made by means of a fourth contact member 61 in the detachable plug connection, which closes a circuit from the start-and-stop push-button 44 to the operating coils of a main alternating-current contactor 63 and a field rheostat relay 64. The alternating-current contactor 63 connects the alternating-current compressor motor 42 to the external three-phase source of supply, through the detachable plug connection 41, no special starting means being provided either in connection with the alternating-current motor or in connection with the compressor, as the alternating-current motor is designed to have a sufficient capacity to start up easily when connected across the three-phase supply line.

The field rheostat relay 64 operates to short-circuit the field-rheostat 57 in the field of the direct-current compressor motor 43, which now operates as a direct-current generator supplying power back into the direct-current bus 3, so as to charge the storage battery whenever the alternating-current motor 42a is driving the compressor. The short-circuiting of some of the resistance in the field circuit of the direct-current compressor machine increases the strength of the direct-current field, thus causing the voltage of the direct-current machine to be higher. The design is such, also, that the alternating-current compressor motor drives the compressor at a slightly higher speed than the direct-current motor does when the latter is operating from the axle generator 4, so that the direct-current machine operates at a higher speed when it is generating than when it is motoring. These two factors, the increased speed and the strengthened field, both contribute to cause the voltage of the direct-current machine 43 to be higher when the compressor is being driven from the alternating-current motor 42 than when it is being driven from the direct-current machine itself. The higher voltage is necessary in order to cause the direct-current machine to supply power back into the storage battery 3 when the compressor dynamo-electric means is operating from its alternating-current end. It will be understood that the necessary increase in the voltage of the direct-current end of this dynamo-electric means may be obtained either by an increase of speed alone or by an increase of the excitation alone.

It may be desirable to make certain that the blower motor 38 is operating whenever the refrigerating plant is started up. No damage would be done by operating the refrigerating plant without having the blower motor in operation for providing for air circulation in the car, but no material benefit would be derived from the refrigerator operation under such circumstances. Hence, in the drawing, we have indicated the start-stop push-button 44 as being provided with auxiliary contacts 66 which connect the off position of the blower-motor starting switch 39 to the first position thereof, so as to make sure that the blower motor 38 is operating whenever the compressor motor 42 or 43 is operating.

From the foregoing description, it will be understood that we have provided a power-supply system for handling the air conditioning of railway cars, our system having a number of important advantages, especially as it offers one solution for pre-cooling cars without the necessity of utilizing inordinately large storage batteries on the cars. It will be noted that this result is obtained with a minimum amount of extra equipment, requiring merely an additional alternating-current motor on the compressor shaft. It will be observed that the compressor, which is the major-power device of the refrigerating equipment, is driven either by a direct-current motor or an alternating-current motor, but the minor-power devices, such as the blower motor or motors, of which there are usually two, one on each side of the car, are provided only with direct-current motors, so that no extra equipment is required for these devices, even when the main compressor drive is motorized from an alternating-current source.

While we have shown our invention in a preferred form of construction, it will be obvious that many of the details may be changed, within the scope of our invention. Thus, any suitable air-conditioning plant may be utilized, so long as the major-power load device thereof is equipped with the direct-current alternating-current dynamo-electric means herein described. The direct-current alternating-current dynamo-electric means may be any means suitable for the purpose, and our illustration and description of the alternating-current compressor motor 42 and direct-current compressor motor 43 are to be taken in their broadest sense as respresentative or symbolic of any dynamo-electric means, either a single machine or an aggregate comprising a plurality of machines, for accomplishing the purposes described. In like manner, the details of the various control equipments, reverse current switch, voltage regulator, exciter, axle generator, and the like, may be modified without departing from the essential features of our invention.

We claim as our invention:

1. An electrical system for a vehicle comprising a vehicle-driven direct-current generator, a direct-current bus, a storage battery connected across the direct-current bus, an electro-responsive reverse-current switching device serving to connect the generator to the direct-current bus when the generator has a voltage sufficient to supply current to the bus and serving to disconnect the generator in time to prevent a material reverse-current flow to the generator, a major-load device, dynamo-electric means having both direct-current and alternating-current terminals for driving said major-load device, a detachable plug connection for supplying externally generated alternating-current energy for the vehicle, means operative, when the vehicle is standing still and its detachable plug connection is plugged in to an external alternating-current source, to operate said major-load dynamo-electric means as an alternating-current motor energized from said detachable plug connection for supplying mechanical energy to said major-load device and to operate said major-load dynamo-electric means at the same time as a direct-current generator for supplying electrical energy to said direct-current bus, and means operative, at other times, to operate said major-load dynamo-electric means solely as a direct-current motor energized from the direct-current bus for supplying mechanical energy to said major-load device.

2. An electrical system for a vehicle comprising a vehicle-driven direct-current generator, a direct-current bus, a storage battery connected across the direct-current bus, an electro-responsive reverse-current switching device serving to connect the generator to the direct-current bus when the generator has a voltage sufficient to supply current to the bus and serving to disconnect the generator in time to prevent a material reverse-current flow to the generator, a detachable plug connection for supplying externally generated alternating-current energy for the vehicle, a major-power load device, and dynamo-electric converter-means connectable simultaneously to the direct-current bus and the alternating-current detachable plug connection for driving said major-load device and operable, when the vehicle is standing still and said detachable plug connection is plugged in to an external alternating-current source, to also supply direct-current power to said direct-current bus.

3. An electrical system for a vehicle comprising a vehicle-driven direct-current generator, a direct-current bus for distributing electric current to a plurality of outlets for general lighting and other utility purposes on said vehicle, a storage battery connected across the direct-current bus, an electro-responsive reverse-current switching device serving to connect the generator to the direct-current bus when the generator has a voltage sufficient to supply current to the bus and serving to disconnect the generator in time to prevent a material reverse-current flow to the generator, a detachable plug connection for supplying externally generated alternating-current energy for the vehicle, a major-load device, and dynamo-electric converter-means connectable simultaneously to the direct-current bus and the alternating-current detachable plug connection for driving said major-load device and operable, when the vehicle is standing still and said detachable plug connection is plugged in to an external alternating-current source, to also supply direct-current power to said direct-current bus.

4. An electrical system for a vehicle comprising a vehicle-driven direct-current generator, a direct-current bus, a storage battery connected across the direct-current bus, an electro-responsive reverse-current switching device serving to connect the generator to the direct-current bus when the generator has a voltage sufficient to supply current to the bus and serving to disconnect the generator in time to prevent a material reverse-current flow to the generator, a detachable plug connection for supplying externally generated alternating-current energy for the vehicle, a mechanical-load device requiring an amount of power which is large compared to the capacity of the battery, and dynamo-electric converter-means connectible simultaneously to the direct-current bus and the alternating-current detachable plug connection for driving said mechanical load device and operable, when the vehicle is standing still and said detachable plug connection is plugged in to an external alternating-current source, to also supply direct-current power to said direct-current bus.

5. An electrical system for a vehicle comprising a vehicle-driven direct-current generator, a direct-current bus, a storage battery connected across the direct-current bus, an electro-responsive reverse-current switching device serving to connect the generator to the direct-current bus when the generator has a voltage sufficient to supply current to the bus and serving to disconnect the generator in time to prevent a material reverse-current flow to the generator, a detachable plug connection for supplying externally generated alternating-current energy for the vehicle, a mechanical-load device requiring an amount of power which is large compared to the capacity of the battery, dynamo-electric means having both direct-current terminals and alternating-current terminals for driving said mechanical-load device, said dynamo-electric means being of a type in which the direct-current voltage is independent of the alternating-current voltage, means for, at times, operating said dynamo-electric means as a substantially constant-speed direct-current motor from said direct-current bus with a substantially constant excitation, means for, at other times, when the vehicle is standing still and said detachable plug connection is plugged in to an external alternating-current source, operating said dynamo-electric means at a slightly higher speed as a substantially constant-speed alternating-current motor from said alternating-current plug and simultaneously operating said dynamo-electric means as a direct-current generator supplying power to said direct-current bus, and automatic means, operative when the last-mentioned operation is taking place, to cause the direct-current end of said dynamo-electric means to operate with a stronger excitation than when it was operating as a direct-current motor.

6. An electrical system for a vehicle comprising a vehicle-driven direct-current generator, a direct-current bus, a storage battery connected across the direct-current bus, an electro-responsive reverse-current switching device serving to connect the generator to the direct-current bus when the generator has a voltage sufficient to supply current to the bus and serving to disconnect the generator in time to prevent a material reverse-current flow to the generator, a detachable plug connection for supplying externally generated alternating-current energy for the vehicle, a mechanical-load device requiring an amount of power which is large compared to the capacity of the battery, dynamo-electric means having both direct-current terminals and alternating-current terminals for driving said mechanical-load device, said dynamo-electric means being of a type in which the direct-current voltage is independent of the alternating-current voltage, means for, at times, operating said dynamo-electric means as a substantially constant-speed direct-current motor from said direct-current bus with a substantially constant excitation, and means for, at other times, when the vehicle is standing still and said detachable plug connection is plugged in to an external alternating-current source, operating said dynamo-electric means at a slightly higher speed as a substantially constant-speed alternating-current motor from said alternating-current plug and simultaneously operating said dynamo-electric means as a direct-current generator supplying power to said direct-current bus.

7. An electrical system for a vehicle comprising a vehicle-driven direct-current generator, a direct-current bus, a storage battery connected across the direct-current bus, an electro-responsive reverse-current switching device serving to connect the generator to the direct-current bus when the generator has a voltage sufficient to supply current to the bus and serving to disconnect the generator in time to prevent a material reverse-current flow to the generator, a detachable plug connection for supplying externally generated alternating-current energy for the vehicle, a mechanical load device requiring an amount of power which is large compared to the capacity of the battery, dynamo-electric means having both direct-current terminals and alternating-current terminals for driving said mechanical-load device, said dynamo-electric means being of a type in which the direct-current voltage is independent of the alternating-current voltage, means for, at times, operating said dynamo-electric means as a substantially constant-speed direct-current motor from said direct-current bus with a substantially constant excitation, means for, at other times, when the vehicle is standing still and said detachable plug connection is plugged in to an external alternating-current source, operating said dynamo-electric means as a substantially constant-speed alternating-current motor from said alternating-current bus and simultaneously operating said dynamo-electric means as a direct-current generator supplying power to said direct-current bus, and automatic means, operative when the last-mentioned operation is taking place, to cause the direct-current end of said dynamo-electric means to operate with a stronger excitation than when it was operating as a direct-current motor.

8. An electrical system for a variable-speed vehicle comprising a vehicle-driven generator, a voltage-regulator adapted to cause said generator to operate at a substantially constant voltage when driven at any speed above a predetermined minimum speed, a storage battery having a discharge voltage less than said substantially constant generator-voltage, a direct-current bus connected across the terminals of said storage battery, an electro-responsive reverse-current switch for connecting said axle-driven generator to said direct-current bus when the generator has a voltage sufficient to supply current to the bus during the acceleration of said railway-car and for disconnecting the generator in time to prevent a material reverse-current flow to the generator during the deceleration of the railway-car, a lighting-circuit feeder, a feeder-regulator for supplying said lighting-current feeder with substantially constant-voltage power from said bus, notwithstanding the increase in voltage on the latter when said axle-driven generator is supplying power thereto, a major-power device, dynamo-electric means having both direct-current and alternating-current terminals for driving said major-power device, a detachable plug connection for supplying externally generated alternating-current energy for the vehicle, means for, at times, energizing the direct-current terminals of the major-power dynamo-electric means from the direct-current bus, and means for, at times, energizing the alternating-current terminals of the major-power dynamo-electric means from the detachable plug connection and at the same time causing the direct-current terminals of the major-power dynamo-electric means to supply direct-current power to said direct-current bus.

HERMAN C. KRAPF.
CHARLES KERR, Jr.
STANLEY G. NOTTAGE.